Aug. 18, 1936.  W. C. HEDGCOCK  2,051,599
TRUCK
Filed Nov. 11, 1932   9 Sheets-Sheet 4

Inventor:
William C. Hedgcock,
By Wilkinson, Huxley, Byron & Knight
Attys.

Aug. 18, 1936.  W. C. HEDGCOCK  2,051,599
TRUCK
Filed Nov. 11, 1932  9 Sheets-Sheet 6

Inventor:
William C. Hedgcock

Aug. 18, 1936.   W. C. HEDGCOCK   2,051,599
TRUCK
Filed Nov. 11, 1932   9 Sheets-Sheet 9

Inventor:
William C. Hedgcock,
By Wilkinson, Huxley, Byron & Knight
Attys.

Patented Aug. 18, 1936

2,051,599

UNITED STATES PATENT OFFICE 2,051,599

TRUCK

William C. Hedgcock, Wilmette, Ill., assignor to American Steel Foundries, Chicago, Ill., a corporation of New Jersey Application November 11, 1932, Serial No. 642,143

31 Claims. (Cl. 105—197.2)

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series, the coil springs responding to the light, quick shocks, the leaf springs to the slow, heavy impulses. Coil springs are quick and sensitive to response, leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Yet another object is to provide a truck construction wherein resilient pads are provided for increasing the frictional absorption of certain of the resilient members and/or for dampening out metallic vibrations transmitted through the metallic truck parts, and also for the purpose of deadening noise.

Still another object is to provide spring assemblies wherein there is provided softer cushioning action under light loads, while at the same time providing the necessary stiffness and capacity under heavy loads, these features being combined also to provide a structure which reduces any tendency towary synchronous vibration of the springs.

A different object is to provide a side frame construction of great strength, rigidity and simplicity of construction and design wherein provision is made to position spring members and transmit thrusts therefrom to the side frame.

A yet further object is to provide a car truck construction wherein the load carrying member is positioned on a leaf spring without the necessity of guide means between the load carrying member and side frame, and at the same time coil springs are provided acting independently of the leaf springs.

A still further object is to provide a car truck construction wherein the load is transmitted from the load carrying member to a leaf spring midway between fixed and resilient supports therefor.

With these and various other objects in view the invention may consist of certain novel features of construction and operation as will be more full described and particularly pointed out in the specification, drawings and claims appended hereto.

In the drawings, which illustrate embodiments of the device and wherein like reference characters are used to designate like parts—

Referring first of all more particularly to the truck constructions illustrated in Figures 1 to 4 inclusive, the truck side frame 30 is of the single beam type having a depressed central portion 32, the upper chord 34 of which is provided with the central coil spring seats 36. The side frame is provided adjacent the ends thereof with the journal boxes 38 having cooperative engagement with the journal ends of the wheel and axle assembly 40. The upper chord 34 of the side frame adjacent the journal boxes is provided with the seat portions 42 for accommodating the leaf spring seats 44, the seats being disposed between the spaced flanges 46 forming the pocket 48, the pocket being defined adjacent the ends thereof by the end thrust wall 50 disposed adjacent the inner wall of the journal box. The flanges 46 extend over and merge into the outer wall of the journal box, it being understood of course that these flanges can be continued to form a brake hanger bracket for accommodating outer brake hangers.

The leaf spring seats 44 are provided with the upwardly extending positioning dowel 52 adapted to be received in a suitable aperture formed adjacent the ends of the plate or semi-elliptic leaf spring 54, said spring being provided with the central spring band 56 having interlocking engagement with the leaves. The spring band 56 is seated on the spring cap 58 provided on the coil spring nests 60, said spring nests 60 being supported and positioned on the central or intermediate spring seats 36.

In the form of construction illustrated in Figures 1 to 4 inclusive, the load carrying member 61 is a bolster provided with the center bearing 62 and the side bearings 64. The bolster intermediate the ends thereof is substantially of conventional truss construction, being provided adjacent the ends thereof with the widened portions defined by the arms 66 provided with the brake hanger brackets 68 and connected by the integral end portions 70 provided with the depending wings 72 adapted to embrace the spring band 56. The bolster ends 70 are also provided with the brackets 74 extending longitudinally of the truck and provided with the spaced arcuate spring seats 76 adapted to be seated on the leaf spring 54, the brackets being provided with depending members or flanges 76 disposed on each side of the leaf spring 54 whereby the bolster forms an effective means of maintaining the truck in squared position through the leaf spring.

In the truck construction illustrated in Figures 5 to 9 inclusive, the load carrying member or assembly consists of the transom 78 including the spaced members 80 provided with the brake hanger brackets 82 and the connecting end members 84. The end members 84 are also provided with the wings 86 adapted to embrace the spring band 56, and said end members are provided with the longitudinally extending bracket portions 88 having the spaced arcuate spring seats 90 seated on the leaf spring 54 and provided with the spaced members 92, similar to the members 76, extending alongside the leaf spring for maintaining the truck in squared position. The spaced members 80 are provided with the inwardly and downwardly sloping rocker tracks 94 for accommodating the lateral motion rockers 96 disposed to support the lateral motion bolster 98.

The bolster 98 is of the conventiinal truss construction provided with the center bearing 100 and the side bearings 102, lateral motion of the bolster being limited by means of the lugs 104 provided on the members 80. The lateral motion track 94 is provided with the upper arcuate roller engaging surface 106 for accommodating the arcuate surfaces of the rollers 96, the bolster 98 being provided with the similar arcuate rocker track 108 likewise accommodating the corresponding arcuate surface of the rocker 96. Tongues 110 are provided on the rocker and adapted to be positioned in suitable slots formed in the tracks 106 and 108 for positioning the rocker. The vertical axis of the rocker is disposed to slope upwardly and inwardly to intersect the vertical center line of the bolster whereby the bolster is self-centering.

In these forms of truck construction the endwise forces and the lateral forces between the side frame and bolster or transom are transmitted through the leaf spring to the side frame. The grouping of the coil spring with respect to the leaf spring is substantially midway of the length thereof whereby independent action of the leaf and coil springs may be had to prevent the periods of vibration of each of the springs from synchronizing. It will be noted that the load is applied to the leaf springs midway between the fixed support thereof and the coil springs, making it possible for the leaf springs to deflect without necessarily deflecting the coil springs, or without deflecting the coil springs an amount equivalent to the leaf springs, thus permitting independent oscillation of the springs. This causes the vibration of one spring to be dampened or "rippled" out by that of the other type of spring, preventing corresponding synchronous motion of the car body and lading.

Referring now more particularly to the truck constructions illustrated in Figures 10 to 20 inclusive, the truck side frame 130 is substantially of truss construction, including the upper member 132 and the lower member 134 merging adjacent the ends thereof as at 136 and being provided with the journal boxes 138, having cooperative relation with the journal ends of the wheel and axle assemblies 140. The upper and lower members are integrally connected adjacent the center thereof by means of the vertical strut 142 disposed substantially in vertical alignment with the spring band seat 144 provided on the upper chord of the upper member 132. The merged portion 136 is provided with the spring well 146 adjacent the journal boxes, the spring well being provided adjacent the bottom thereof, which substantially merges with the lower member 134, with the coil spring seat 148. The coil spring seat 148 accommodates the coil spring nest 150 disposed therein and being provided with the upper spring cap 152 having the upwardly extending positioning dowel 154 adapted to be received in a suitable aperture formed adjacent the end in the leaf or plate spring assembly 156. The plate spring assembly 156 is provided with the central spring band 158 interlocking with the leaves of the spring and adapted to be seated and positioned in the seat 144.

Figures 1, 4:
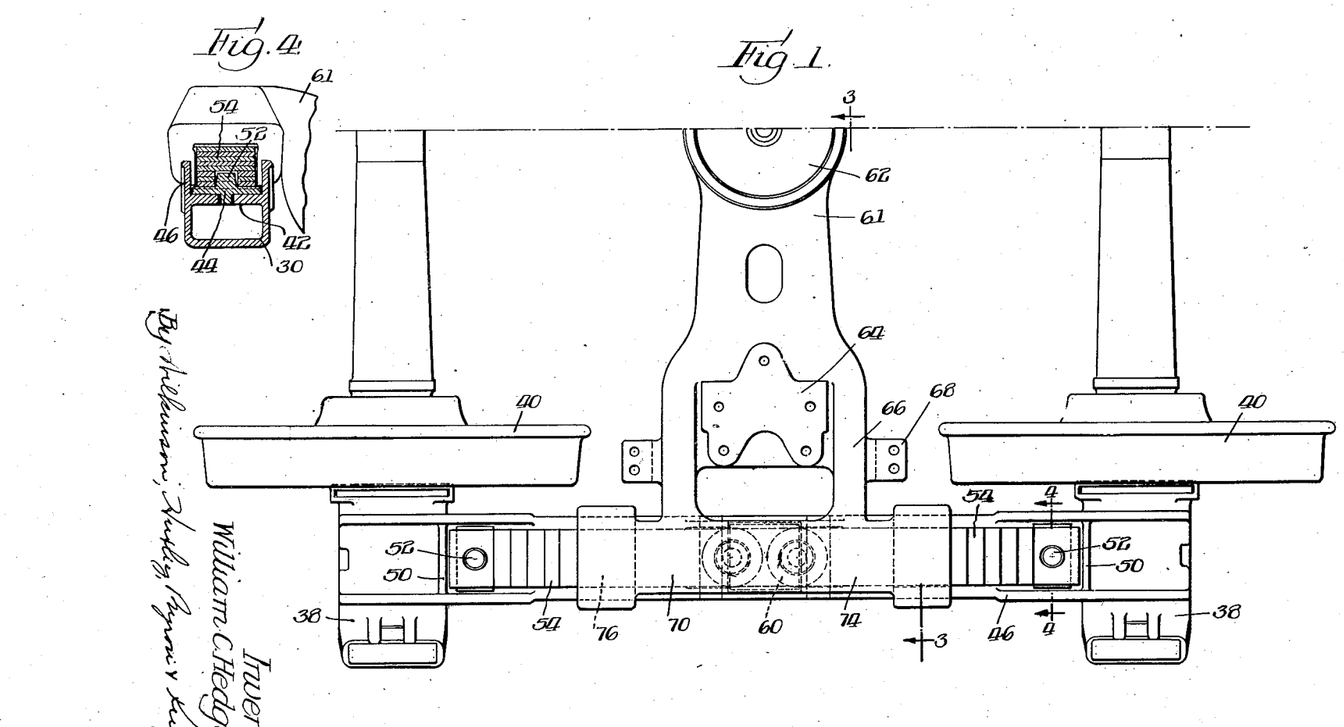
Figure 1 is a fragmentary top plan view of a truck construction embodying the invention.
Figure 4 is a transverse fragmentary sectional elevation taken substantially in the plane as indicated by line 4—4 of Figure 1.
Figure 2:
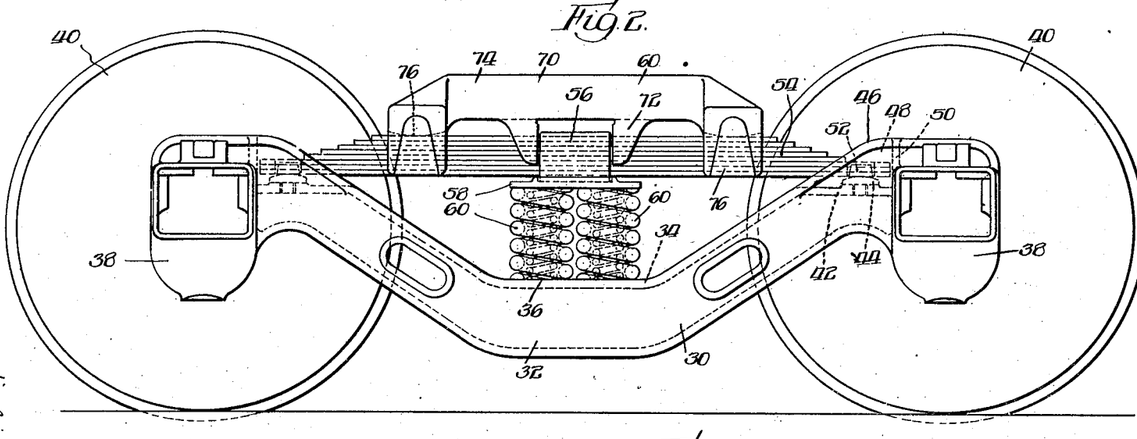
Figure 2 is a side elevation of the truck construction shown in Figure 1.
Figure 3:
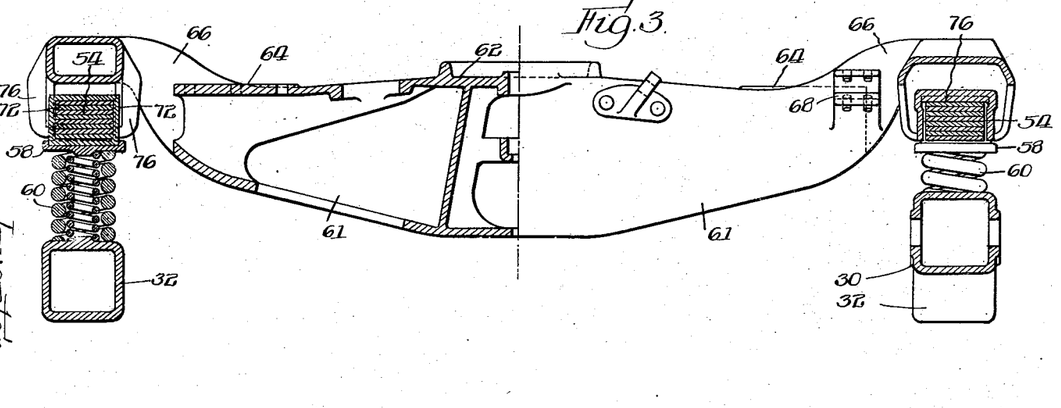
Figure 3 is a transverse sectional elevation of the truck construction shown in Figures 1 and 2, the section to the left of the figure being taken substantially in the plane of the transverse center line of the truck, the section to the right of the figure being taken substantially in the plane as indicated by the line 3—3 of Figure 1.
Figures 5, 8, 9:
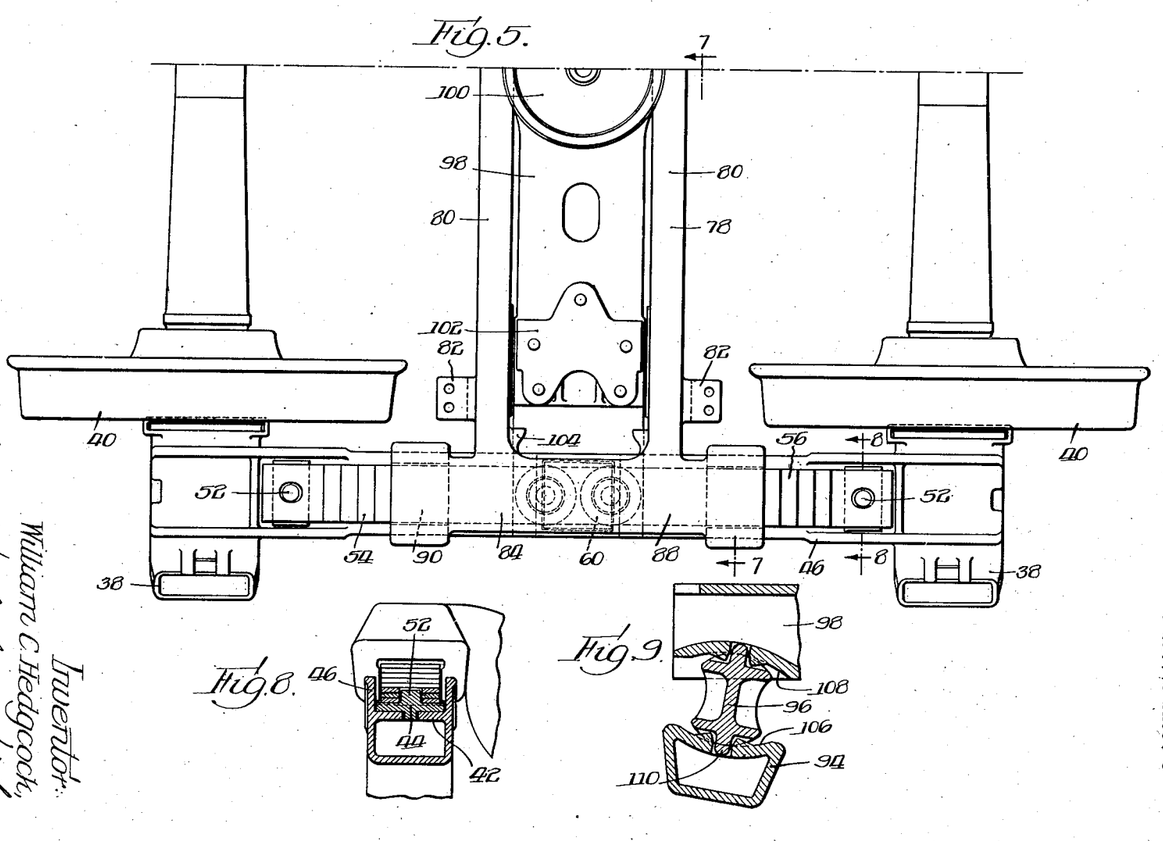
Figure 5 is a fragmentary top plan view of a modified form of truck construction embodying the invention.
Figure 8 is a fragmentary transverse sectional elevation taken substantially in the plane as indicated by the line 8—8 of Figure 5.
Figure 9 is an enlarged fragmentary sectional elevation through the end of the lateral motion bolster showing the bolster mounting on the rocker track of the transom, the same being taken substantially in the plane of the transverse center line of the truck construction illustrated in Figure 5.
Figure 6:
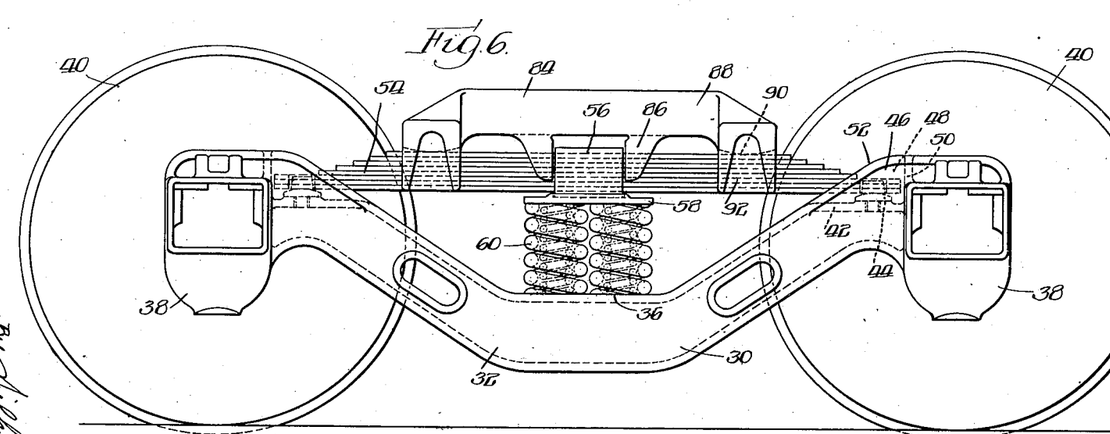
Figure 6 is a side elevation of the truck construction shown in Figure 5.
Figure 7:
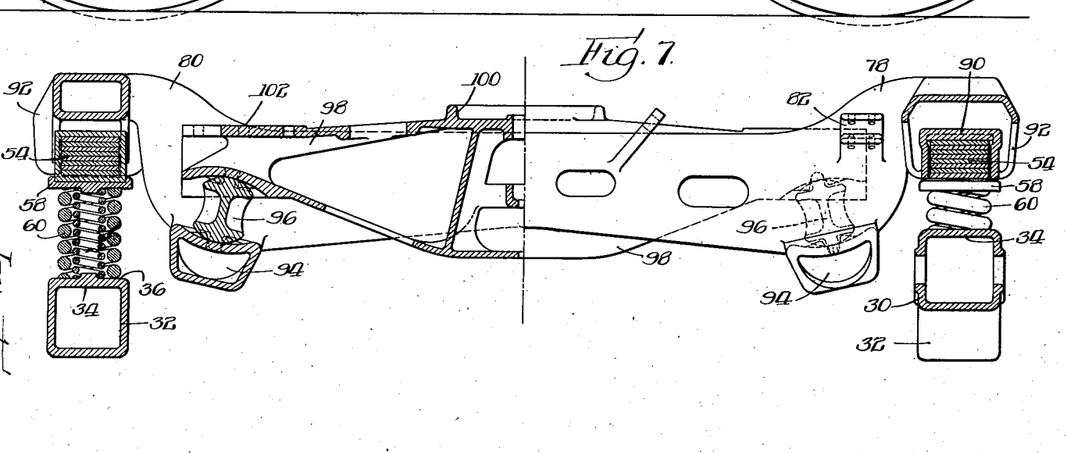
Figure 7 is a transverse sectional elevation of the truck construction shown in Figures 5 and 6, the section to the left of the figure being taken substantially in the plane of the transverse center line of the truck, the section to the right of the figure being taken substantially in the plane as indicated by the line 7—7 of Figure 5.
Figure 10:
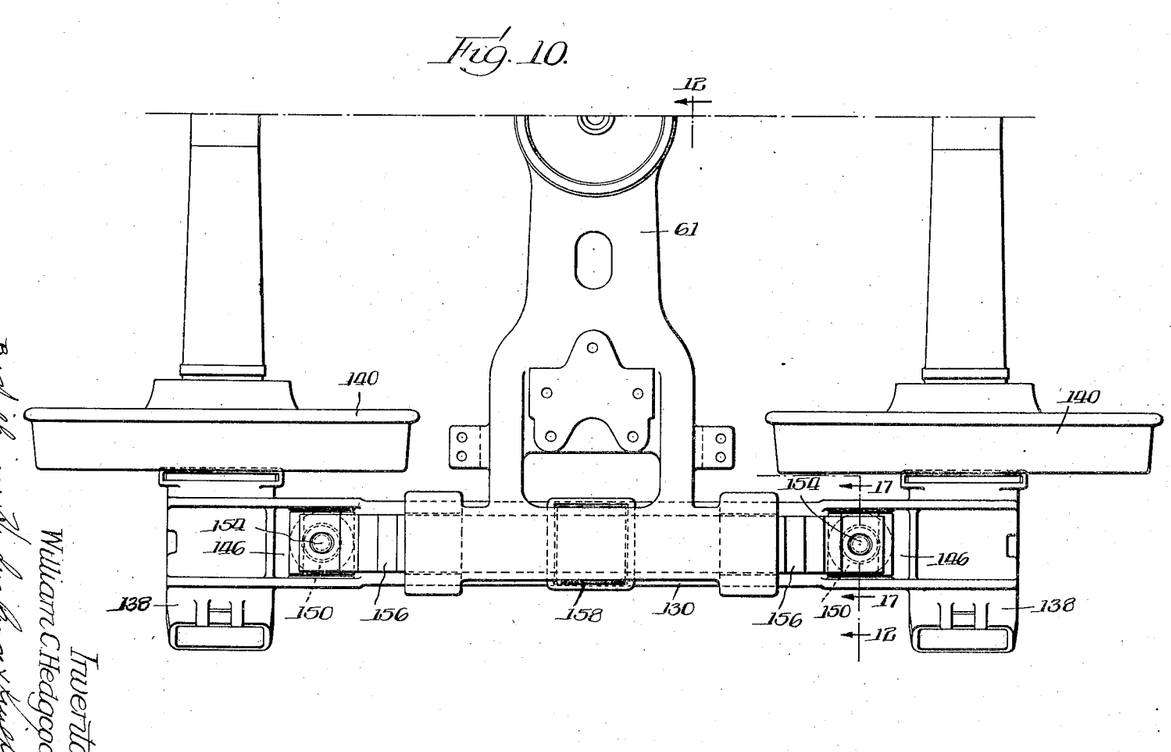
Figure 10 is a fragmentary top plan view of another modified form of truck construction embodying the invention.
Figure 11:
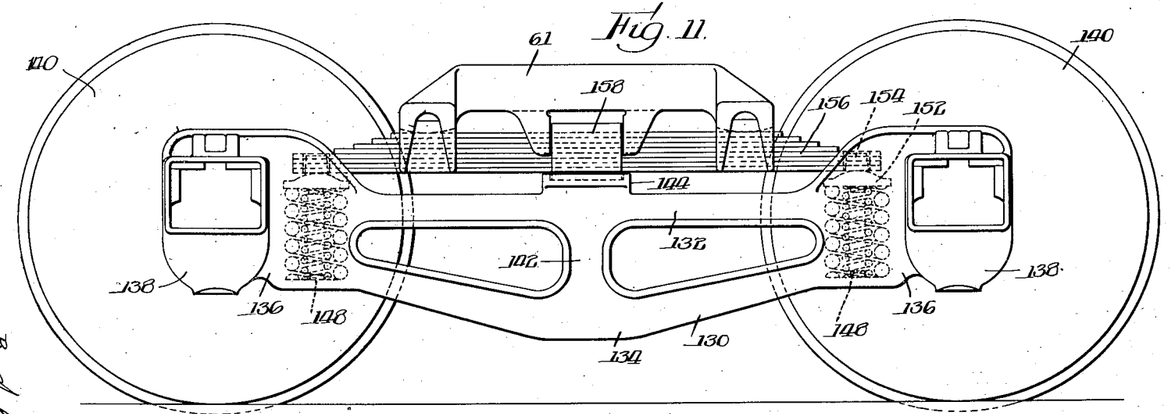
Figure 11 is a side elevation of the truck construction shown in Figure 10.
Figure 12:
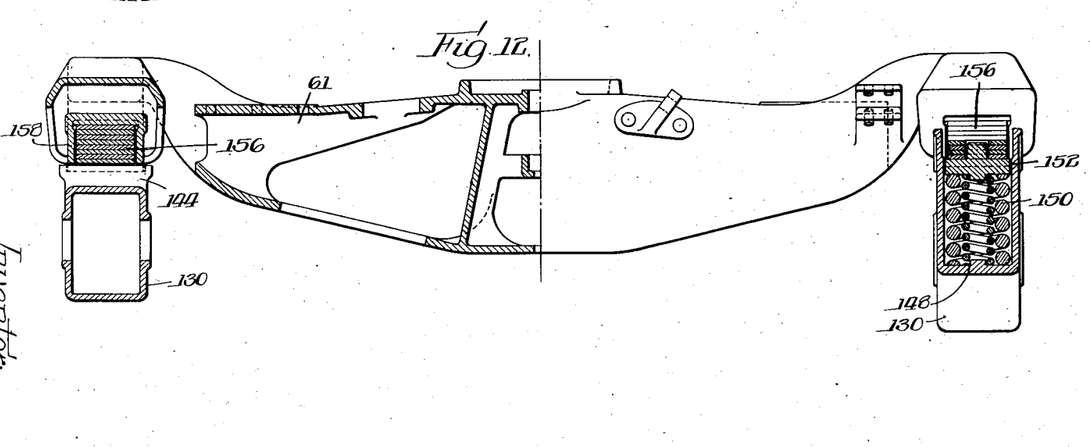
Figure 12 is a transverse sectional elevation of the truck construction shown in Figures 10 and 11, the section to the left of the figure being taken substantially in the plane of the transverse center line of the truck, the section to the right of the figure being taken substantially in the plane as indicated by the line 12—12 of Figure 10.

In the form of construction illustrated in Figures 10, 11 and 12, the load carrying member is the bolster 61 similar to that already described.

Figure 13:
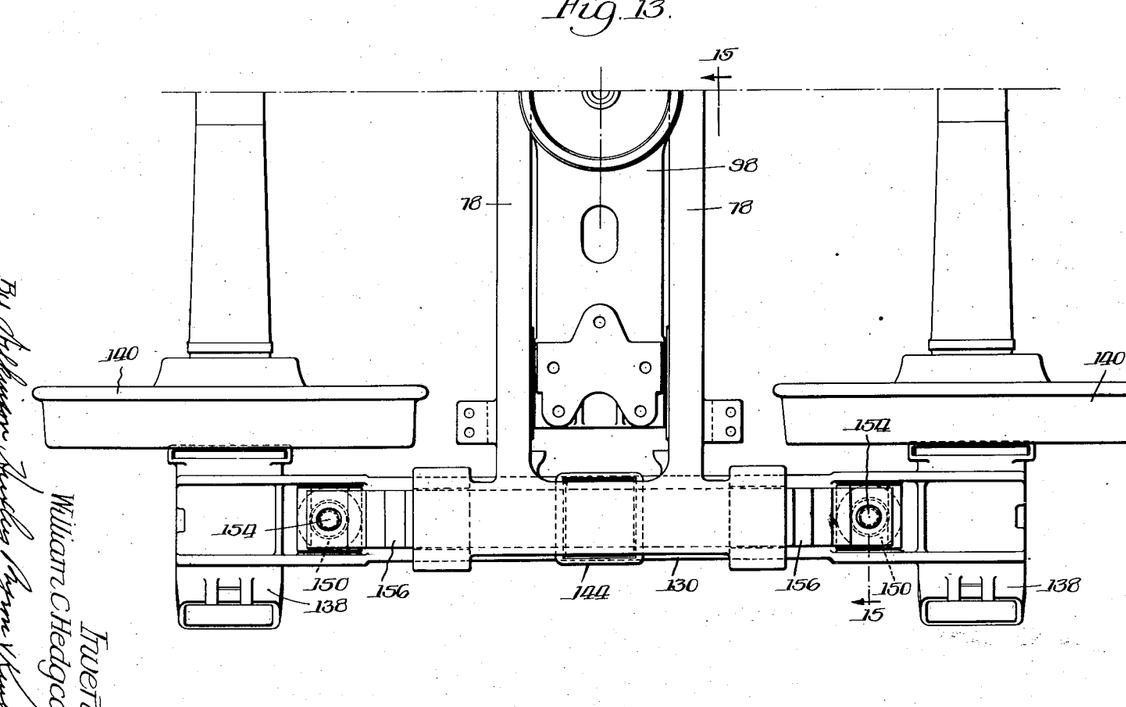
Figure 13 is a fragmentary top plan view of yet another modified form of truck construction embodying the invention.
Figure 14:
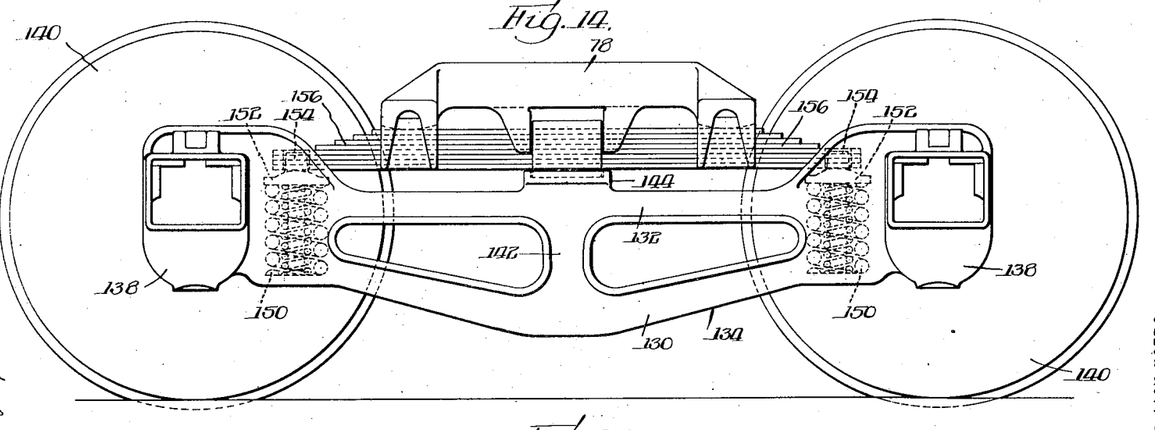
Figure 14 is a side elevation of the truck construction shown in Figure 13.
Figure 15:
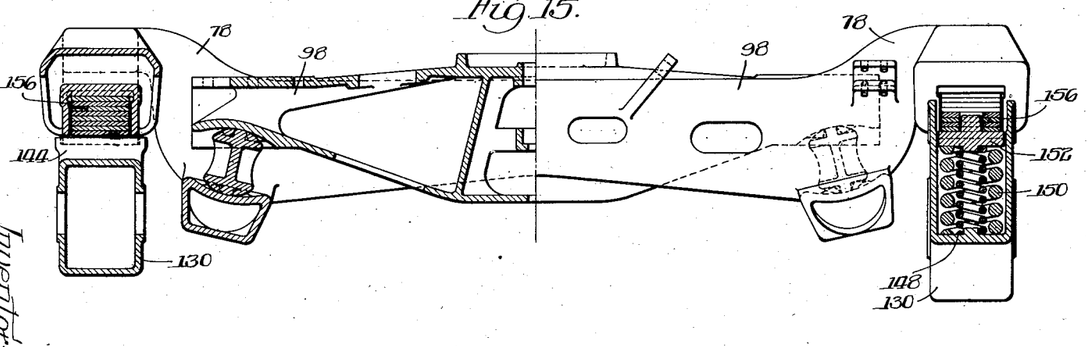
Figure 15 is a transverse sectional elevation of the truck construction shown in Figures 13 and 14, the section to the left of the figure being taken substantially in the plane of the transverse center line of the truck, the section to the right of the figure being taken substantially in the plane as indicated by the line 15—15 of Figure 13.

In the form of construction illustrated in Figures 13, 14 and 15, the load carrying assembly consists of the transom 78 and the lateral motion bolster 98, all as described.

Figure 17:
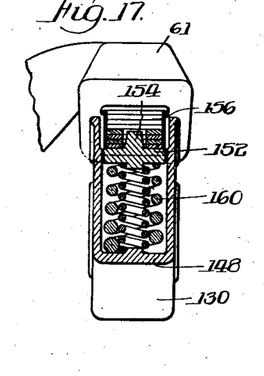
Figure 17 is a transverse fragmentary sectional elevation taken substantially in the plane as indicated by the line 17—17 of Figure 10, showing the leaf spring resiliently mounted on a tapered coil spring of constant pitch and constant diameter.

In the construction shown in Figure 17, the coil spring 160, shown applied to the spring seat 148 and supporting the spring cap 152, is of the tapered type, that is, formed from a tapered bar, and in this construction is of constant pitch and constant diameter.

Figure 18:
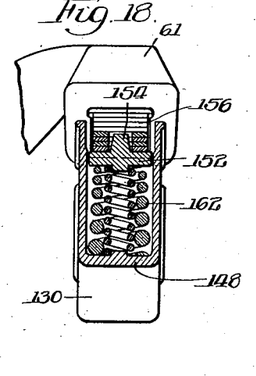
Figure 18 is a transverse sectional elevation corresponding to Figure 17 showing a tapered coil spring of constant diameter and varying pitch.

The coil spring 162 shown in Figure 18 is likewise a tapered spring of constant diameter and varying pitch.

Figure 19:
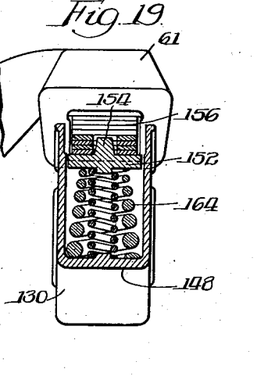
Figure 19 is a transverse sectional elevation corresponding to Figure 17 showing a tapered coil spring of varying diameter and pitch.
Figure 20:
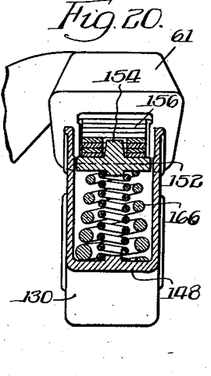
Figure 20 is a transverse sectional elevation corresponding to Figure 17 showing a tapered coil spring of varying diameter and constant pitch.

The coil spring 164 shown in Figure 19 is a tapered spring of varying diameter and varying pitch, whereas the coil spring 166 illustrated in Figure 20 is a tapered spring of varying diameter and constant pitch.

Figure 16:
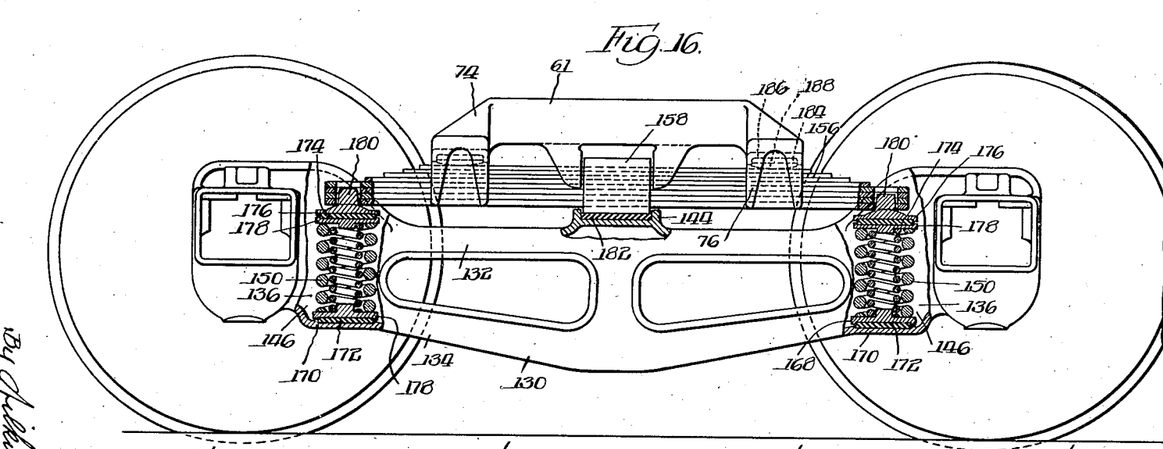
Figure 16 is a fragmentary sectional side elevational of the truck construction illustrated in Figures 11 or 14, showing the application thereto of resilient pads.

The construction shown in Figure 16 is similar to that already described in Figures 10 to 15 inclusive, wherein the load carrying member may be either a transom 78 or a bolster 61. In this construction the coil spring 150 is seated in the well 146 on the spring cap 168 between which and the seat 170 provided in the well the resilient pad 172 is disposed. A resilient pad 174 is likewise disposed between the spaced spring caps 176 and 178 provided on the coil spring 150, the upper cap 174 having a positioning dowel 180 adapted to be received in the outer aperture of the leaf spring assembly 156. The resilient pad 182 is disposed between the seat 144 and the spring band 158, and resilient pads 184 are provided between the seats 186 on the load carrying member brackets 74 (or 88) and seat members 188 adapted to contact the upper portion of the leaf spring assembly and being disposed between the depending positioning flanges 76 (or 92). It is of course to be understood that the resilient pads as well as the tapered springs shown in Figures 16 to 20 inclusive, may also be applied to the truck constructions illustrated in Figures 1 to 12 inclusive.

In the forms of truck illustrated in Figures 10 to 20 inclusive, the positions of the fixed support and the coil spring support of the leaf spring are reversed from that described in Figures 1 to 9 inclusive. The coil springs are placed as supports under each end of the leaf spring, with a rigid support for the leaf spring midway of its length. Endwise and lateral forces between the bolster or transom and the leaf spring are transmitted in a manner similar to that already described, these forces being transmitted from the leaf spring to the side frame through the center spring band seat provided on the side frame. Some part of the transverse forces is transmitted from the leaf spring to the side frame at vertical movable engagement on the ends of the leaf spring, but this engagement of the leaf spring and the side frame is primarily of importance in maintaining the squareness of the truck.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring through seats intermediate said first named and intermediate seats.

2. In a truck, the combination of a side frame including spaced upper and lower members merging adjacent the ends thereof and provided with journal boxes, a central strut integrally connecting said upper and lower members, a spring band seat on said upper member substantially in alignment with said strut, a longitudinally disposed leaf spring having a central spring band supported on said seat, coil springs interposed between the ends of said leaf spring and said side frame adjacent the journal boxes, and a transom supported on said leaf spring at points intermediate said spring band and coil springs.

3. In a truck, the combination of a side frame including spaced upper and lower members merging adjacent the ends thereof and provided with journal boxes, a central strut integrally connecting said upper and lower members, a spring band seat on said upper member substantially in alignment with said strut, a longitudinally disposed leaf spring having a central spring band supported on said seat, coil springs interposed between the ends of said leaf spring and said side frame adjacent the journal boxes, and a bolster supported on said leaf spring at points intermediate said spring band and coil springs.

4. In a car truck, the combination of a side frame including a single beam member having journal boxes adjacent the ends thereof, leaf spring seats adjacent the journal boxes, a leaf spring having the ends thereof supported on said seats, a central spring band on said leaf spring, a coil spring interposed between said band and side frame adjacent the center of said truck, and a bolster supported on said leaf spring intermediate the spring band and journal boxes.

5. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring through seats intermediate said first named and intermediate seats, said coil spring being of variable stiffness.

6. In a truck, the combination of a side frame including spaced journal boxes, and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring through seats intermediate said first named and intermediate seats, said coil spring being of variable section.

7. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring through seats intermediate said first named and intermediate seats, said coil spring being of variable section and constant pitch.

8. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring through seats intermediate said first named and intermediate seats, said coil spring being of variable section and constant pitch and diameter.

9. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring through seats intermediate said first named and intermediate seats, said coil spring being of variable section and diameter and constant pitch.

10. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring through seats intermediate said first named and intermediate seats, said coil spring being of variable section, pitch and diameter.

11. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring through seats intermediate said first named and intermediate seats, said coil spring being of variable section and pitch and constant diameter.

12. In a truck, the combination of a side frame including spaced journal boxes and a connecting beam member, said beam member having a seat adjacent the center thereof, said side frame having seats adjacent said journal boxes, a leaf spring non-resiliently supported on said first named seat intermediate the ends thereof and resiliently supported on the second named seats adjacent the ends thereof, and a load carrying member supported on said leaf spring through spaced seats disposed on said leaf spring intermediate said first and second named seats, the resilient support including a coil spring of variable stiffness.

13. In a truck, the combination of a side frame including spaced journal boxes and a connecting beam member, said beam member having a seat adjacent the center thereof, said side frame having seats adjacent said journal boxes, a leaf spring non-resiliently supported on said first named seat intermediate the ends thereof and resiliently supported on the second named seats adjacent the ends thereof, and a load carrying member supported on said leaf spring through spaced seats disposed on said leaf spring intermediate said first and second named seats, the resilient support including a coil spring of variable section.

14. In a truck, the combination of a side frame including spaced journal boxes and a connecting beam member, said beam member having a seat adjacent the center thereof, said side frame having seats adjacent said journal boxes, a leaf spring non-resiliently supported on said first named seat intermediate the ends thereof and resiliently supported on the second named seats adjacent the ends thereof, and a load carrying member supported on said leaf spring through spaced seats disposed on said leaf spring intermediate said first and second named seats, the resilient support including a coil spring of variable section and constant pitch.

15. In a bolster, the combination of a body portion having center and side bearings, laterally extending bracket portions adjacent the ends thereof having spaced seats thereon, depending flanges on each side of said seats, and depending wings intermediate said seats.

16. In a transom, the combination of a body portion and end portions, said end portions having laterally extending bracket portions provided with spaced seats thereon, depending flanges on each side of said seats, and depending wings intermediate said seats.

17. In a side frame, the combination of spaced journal boxes connected by spaced members, a central strut integrally connecting said members, a seat on one of said members substantially in alignment with said strut and coil spring seats disposed in said members adjacent said journal boxes.

18. In a truck, the combination of a side frame including spaced journal boxes and a connecting beam member, said beam member having a seat adjacent the center thereof, said side frame having seats adjacent said journal boxes, a leaf spring resiliently supported on resilient pads disposed on said first named seat intermediate the ends thereof and resiliently supported on the second named seats adjacent the ends thereof by coil springs, said leaf spring being supported on resilient pads carried by said coil springs, and a load carrying member supported on said leaf spring through spaced seats disposed on said leaf spring intermediate said first and second named seats, resilient pads being interposed between said load carrying member and leaf spring.

19. In a car truck, the combination of a side frame including a single beam member having journal boxes adjacent the ends thereof, leaf spring seats adjacent the journal boxes, a leaf spring having the ends thereof supported on said seats, a central spring band on said leaf spring, a coil spring interposed between said band and side frame adjacent the center of said truck, and a transom supported on said leaf spring intermediate the spring band and journal boxes.

20. In a truck, the combination of a side frame, a longitudinally disposed leaf spring supported adjacent its ends on said side frame, a support for said leaf spring adjacent the center thereof, one of the supports of the leaf spring being resilient, and a load carrying member supported on said leaf spring intermediate the second named support and the ends of said spring.

21. In a truck, the combination of a side frame, a longitudinally disposed leaf spring resiliently supported adjacent its ends on said side frame, a support for said leaf spring adjacent the center thereof, and a load carrying member supported on said leaf spring intermediate the second named support and the ends of said spring.

22. In a truck, the combination of a side frame, a longitudinally disposed leaf spring resiliently supported adjacent its ends on said side frame, a non-resilient support for said leaf spring adjacent the center thereof, and a load carrying member supported on said leaf spring intermediate the second named support and the ends of said spring.

23. In a truck, the combination of a side frame, a longitudinally disposed leaf spring supported adjacent its ends on said side frame, a resilient support for said leaf spring adjacent the center thereof, and a load carrying member supported on said leaf spring intermediate the second named support and the ends of said spring.

24. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed to support said leaf spring on said intermediate seat, and a load carrying member supported on said leaf and coil springs at a point intermediate said second named seat and one of of said first named seats.

25. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed to support said leaf spring on said intermediate seat, and a load carrying member supported on said leaf and coil springs through seats intermediate said first named and intermediate seats.

26. In a truck, the combination of a side frame including spaced journal boxes and a connecting beam member, spring seats adjacent the journal boxes, a spring seat intermediate said journal boxes, a leaf spring disposed substantially in the plane of said side frame and non-resiliently supported on said first named seats, a coil spring disposed between said leaf spring and supported on said intermediate seat, and a load carrying member supported on said leaf spring and coil spring at a point intermediate said second named seat and one of said first named seats.

27. In a truck, the combination of a side frame, a longitudinally disposed leaf spring supported adjacent its ends on said side frame, a support for said leaf spring adjacent the center thereof, one of the supports for said leaf spring being through a spring of different character than said leaf spring, and a load carrying member supported on said springs at a point intermediate the support adjacent the center of the spring and one of the other supports.

28. In a truck, the combination of a side frame, a longitudinally disposed leaf spring supported adjacent the center thereof on said side frame, a support for said spring on both sides of said first named support, one of said supports being resilient, and a load carrying member supported on said leaf spring intermediate said first named support and the ends of said leaf spring.

29. In a truck, the combination of a side frame, a longitudinally disposed leaf spring supported adjacent the center thereof on said side frame, a support for said spring on both sides of said first named support, one of said supports being resilient, and a load carrying member supported on said leaf spring at points spaced from said first named support.

30. In a truck, the combination of a side frame, a longitudinally disposed leaf spring supported adjacent the center thereof on said side frame, a support for said spring on both sides of said first named support, one of said supports being movable in a vertical direction, and a load carrying member supported on said leaf spring intermediate said first named support and the ends of said leaf spring.

31. In a truck, the combination of a side frame, a longitudinally disposed leaf spring supported adjacent the center thereof on said side frame, a support for said spring on both sides of said first named support, and a load carrying member supported on said leaf spring at points spaced from said first named support, one of said supports being movable in a vertical direction.

WILLIAM C. HEDGCOCK.